United States Patent
Chae

(10) Patent No.: US 8,610,925 B2
(45) Date of Patent: Dec. 17, 2013

(54) IMAGE FORMING APPARATUS AND METHOD OF DISTINGUISHING XPS FILE

(75) Inventor: Sung-won Chae, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 645 days.

(21) Appl. No.: 12/821,395

(22) Filed: Jun. 23, 2010

(65) Prior Publication Data

US 2011/0149339 A1    Jun. 23, 2011

(30) Foreign Application Priority Data

Dec. 21, 2009   (KR) .............................. 2009-0128124

(51) Int. Cl.
*G06F 3/12*      (2006.01)
*G06F 17/30*     (2006.01)
*G06F 12/02*     (2006.01)

(52) U.S. Cl.
CPC ........ *G06F 17/30864* (2013.01); *G06F 12/023* (2013.01)
USPC ............................ 358/1.15; 707/708; 711/171

(58) Field of Classification Search
USPC ................. 358/1.13, 1.15, 1.9, 471; 707/708; 711/171
See application file for complete search history.

(56) References Cited

U.S. PATENT DOCUMENTS

| 7,916,332 | B2 * | 3/2011 | Kato | 358/1.15 |
| 8,032,571 | B2 * | 10/2011 | Lee | 707/824 |
| 8,060,490 | B2 * | 11/2011 | Widjaja et al. | 707/708 |
| 2008/0052321 | A1 * | 2/2008 | Nakase | 707/200 |
| 2008/0301277 | A1 * | 12/2008 | Tsujiguchi | 709/223 |
| 2009/0089533 | A1 * | 4/2009 | Nogawa et al. | 711/171 |
| 2010/0131486 | A1 * | 5/2010 | Widjaja et al. | 707/708 |
| 2010/0157364 | A1 * | 6/2010 | Kim | 358/1.15 |
| 2011/0058204 | A1 * | 3/2011 | Chae et al. | 358/1.13 |
| 2011/0167173 | A1 * | 7/2011 | Bansal et al. | 709/247 |
| 2011/0219451 | A1 * | 9/2011 | McDougal et al. | 726/23 |

FOREIGN PATENT DOCUMENTS

| JP | 2002-321427 | 11/2002 | |
| JP | 2008234506 | * 3/2007 | G06F 3/12 |

* cited by examiner

*Primary Examiner* — Jerome Grant, II
(74) *Attorney, Agent, or Firm* — Stanzione & Kim, LLP

(57) ABSTRACT

An image forming apparatus including a communication interface to receive printing data from the external device, a determiner to determine whether the received printing data is a compressed file, an extractor to extract a file name in at least one local file header of the printing data, when the received printing data is the compressed file, a distinguisher to determine presence or absence of an XPS file (extensible markup language paper specification file) by comparing an extension of the extracted file name with a predefined extension to distinguish the XPS file, and an image former to print the printing data in the determined XPS file.

22 Claims, 7 Drawing Sheets

FIG. 4

```
                    410                                                    400
00000000: 50 4B 03 04 14 00 02 00|08 00 82 6D 81 35 59 2D | PK ■■ ¢╖ 鎖?Y-
00000010: 7A BD F7 00 00 00 C6 00|00 00 1B 00 1C 00 46 69 | z쏘 ¢¢¢¢■ ¢ ¢i
00000020: 78 65 64 44 6F 63 75 6D|65 6E 74 53 65 71 75 65 | xedDocumentSeque
00000030: 6E 63 65 2E 66 64 73 65|71 20 A2 18 00 28 A0 14 | nce.fdseq ? ¢?
00000040: 00 00 00 00 00 00 00 00|00 00 00 00 00 00 00 00 | ¢¢¢¢¢¢¢¢¢¢¢¢¢¢¢¢
00000050: 00 00 00 00 00 ED BD 07|60 1C 49 96 25 26 2F 6D | ¢¢¢¢蕉■` I?&/m
00000060: CA 7B 7F 4A F5 4A D7 E0|74 A1 08 80 60 13 24 D8 | ?{J?퀄t? `■$ ¢
```

FIG. 5

```
                              510       520       400
00000000: 50 4B 03 04 14 00 02 00|08 00 82 6D 81 35 59 2D | PK ■■ ¢╖ 鎖?Y-
00000010: 7A BD F7 00 00 00 C6 00|00 00 1B 00 1C 00 46 69 | z쏘 ¢¢¢¢■ ¢ ¢i
00000020: 78 65 64 44 6F 63 75 6D|65 6E 74 53 65 71 75 65 | xedDocumentSeque
00000030: 6E 63 65 2E 66 64 73 65|71 20 A2 18 00 28 A0 14 | nce.fdseq ? ¢?
00000040: 00 00 00 00 00 00 00 00|00 00 00 00 00 00 00 00 | ¢¢¢¢¢¢¢¢¢¢¢¢¢¢¢¢
00000050: 00 00 00 00 00 ED BD 07|60 1C 49 96 25 26 2F 6D | ¢¢¢¢蕉■` I?&/m
00000060: CA 7B 7F 4A F5 4A D7 E0|74 A1 08 80 60 13 24 D8 | ?{J?퀄t? `■$ ¢
00000070: 90 40 10 EC C1 88 CD E6|92 EC 1D 69 47 23 29 AB | ?■裨닭??iG#) ¢
```

FIG. 6

| Part | Segments | Extension | Example |
|---|---|---|---|
| FixedDocumentSequence | Node | .fdseq | /FixedDocSeq.fdseq |
| FixedDocument | /Documents/n/ | .fdoc | /Documents/3/FixedDocument.fdoc |
| FixedPage | /Documents/n/Pages/ | .fpage | /Documents/2/Pages/3.fpage |
| Resource parts | /Documents/n/Resources/ /Resources/ | | /Resources/63B51F81-C868-11D0-999C-00C04FD655E1.odttf |
| Font (Resource part) | Fonts/ | | /Documents/1/Resources/Fonts/Arial.ttf /Resources/F2ABC7B7-C60D-4FB9-AAE4-3CA0F6C7038A..odttf |
| Font (Resource part) | Images/ | | /Documents/3/Resources/Images/dog.jpg /Resources/images/E0D79307-846E-11CE-9641-444553540000.jpg |
| Remote Resource Dictionary (Resource part) | Dictionaries/ | .dict | /Documents/2/Resources/Dictionaries/Shapes.dict /Resources/0DDF3BE2-E692-15D1-AB06-B0AA00BDD685.dict |
| DocumentStructure | /Documents/n/Structure/ | .struct | /Documents/1/Structure/DocStructure.struct |
| FixedPage | /Documents/n/Structure/Fragments | .frag | /Documents/2/Structure/Fragments/3.frag |
| IOC profile | /Documents/n/Metadata/ /Metadata/ | | |
| Resource parts | /Documents/n/Metadata/ /Metadata/ | .png .jpg | /Documents/1/Metadata/5.png |
| PrintTicket | /Metadata/ /Documents/n/Metadata/ | .xml | /Metadata/Job_PT.xml /Documents/1/Metadata/Page2_PT.xml |
| non-standard parts | /Documents/n/Other/ | | |

| Description | Content type |
|---|---|
| FixedDocument | application/vnd.ms-package.xps-fixeddocument+xml |
| FixedDocumentSequence | application/vnd.ms-package.xps-fixeddocumentsequence+xml |
| FixedPage | application/vnd.ms-package.xps-fixedpage+xml |
| DiscardControl | application/vnd.ms-package.xps-discard-control+xml |
| DocumentStructure | application/vnd.ms-package.xps-documentstructure+xml |
| Font | application/vnd.ms-opentype |
| ICC profile | application/vnd.ms-color.iccprofile |
| JPEG image | image/jpeg |
| Obfuscated font | application/vnd.ms-package.obfuscated-opentype |
| PNG image | image/png |
| PrintTicket | application/vnd.ms-printing.printticket+xml |
| Remote resource dictionary | application/vnd.ms-package.xps-resourcedictionary+xml |
| StoryFragments | application/vnd.ms-package.xps-storyfragments+xml |
| TIFF image | image/tiff |
| Thumbnail part | image/jpeg or image/png |
| Windows Media Photo image | image/vnd.ms-photo |

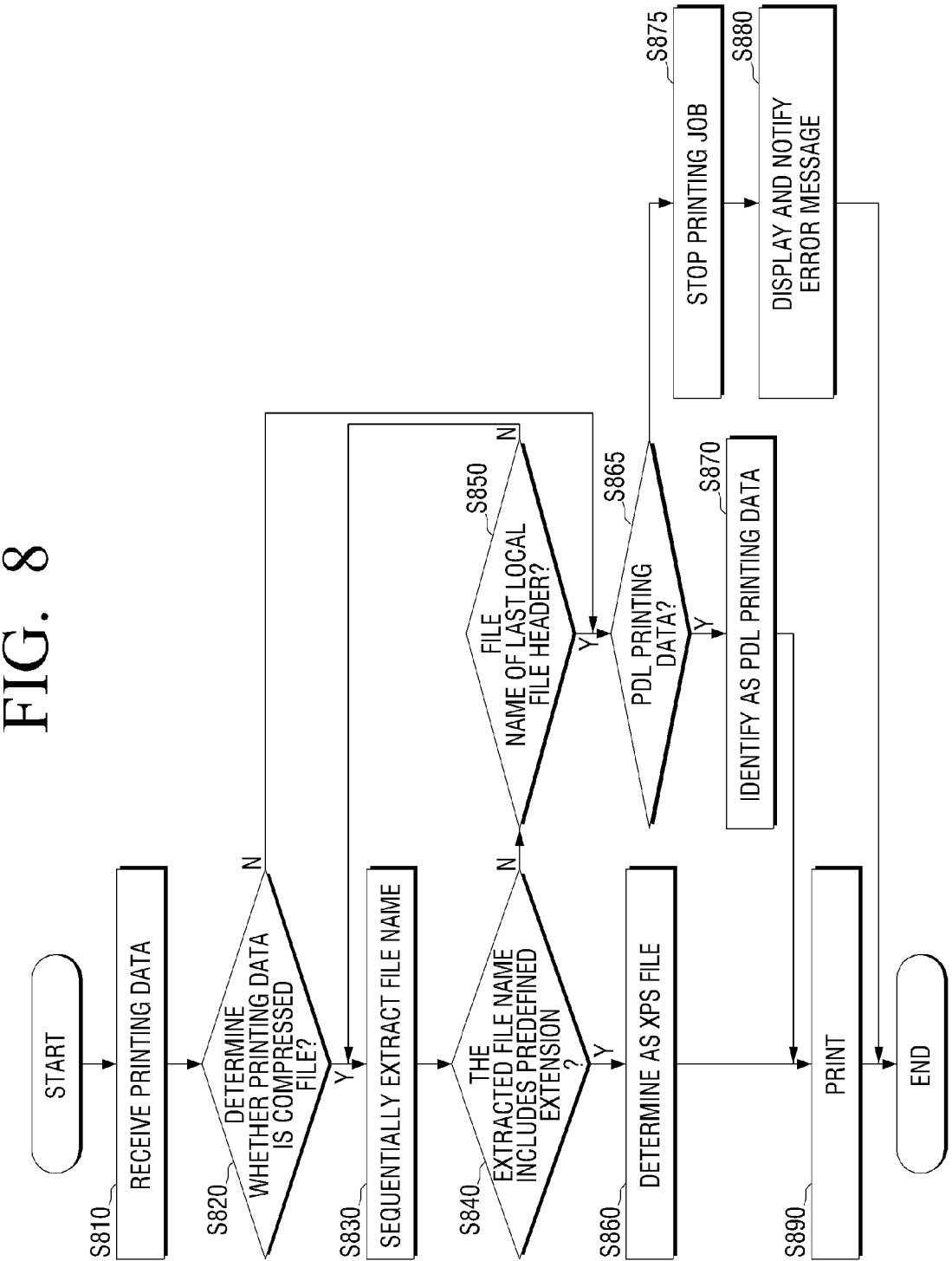

IMAGE FORMING APPARATUS AND METHOD OF DISTINGUISHING XPS FILE

CROSS-REFERENCE TO RELATED APPLICATIONS

This application claims the benefit under 35 U.S.C. §119(a) from Korean Patent Application No. 2009-128124 filed on Dec. 21, 2009 in the Korean Intellectual Property Office, the entire disclosure of which is incorporated herein by reference.

BACKGROUND

1. Field of the Invention

The present general inventive concept relates to an image forming apparatus and a method of distinguishing an XML (extensible markup language) Paper Specification (XPS) file. More specifically, the present general inventive concept relates to an image forming apparatus to improve a recognition speed of an XPS file and a method of distinguishing the XPS file.

2. Description of the Related Art

In general, an image forming apparatus is a device which prints printing data generated at a terminal, such as computer, onto a recording medium. Examples of the image forming apparatus include a copier, a printer, a fax machine, and a Multi Function Peripheral (MFP) integrating functions of the copier, the printer, and the fax machine in a single apparatus.

Image forming apparatuses recently provided support not only printing data written in a conventional Page Description Language (PDL) such as PostScript (PS) and Printer Command Language (PCL) but also a printing function of an XPS file with an XPS emulator.

The XPS file is a fixed-layout electronic file which can preserve a document format and share the file. The XPS file systemizes every resource required for the corresponding document or job in a directory structure and then compresses every data and resource written in the XML with the reference between them in a ZIP format. The XPS file has a logical tree structure including a plurality of layers as illustrated in FIG. 2.

The XPS file of FIG. 2 is in the hierarchical structure such as job levels, document levels, and page levels. Each document level and page level can include a plurality of documents and pages. Different printing options can be set per document and per page.

To examine whether the received printing data is the XPS file, a conventional image forming apparatus distinguishes the XPS file by checking whether the XPS file includes a particular attribute value.

However, since the XPS file is the compressed file as stated above, it is essential to decompress the XPS file to examine the attributes in the XPS file. In this regard, it takes a considerable time to recognize the XPS file. In particular, when a file including the particular attribute value is at the end of the XPS file, it takes an even longer time to determine whether the received printing data is the XPS file.

SUMMARY

The present general inventive concept provides an image forming apparatus to improve a recognition speed of an XPS file, and a method of distinguishing the XPS file.

Additional features and utilities of the present general inventive concept will be set forth in part in the description which follows and, in part, will be obvious from the description, or may be learned by practice of the present general inventive concept.

Exemplary embodiments of the present general inventive concept may provide an image forming apparatus which includes a communication interface to receive printing data from the external device, a determiner to determine whether the received printing data is a compressed file, an extractor to extract a file name in at least one local file header of the printing data when the received printing data is the compressed file, a distinguisher to determine a presence or absence of an XPS file by comparing an extension of the extracted file name with a predefined extension to distinguish the XPS file; and an image former for printing the printing data identified as the XPS file.

The external device may be at least one of a print control terminal and a portable storage medium connectable to the image forming apparatus.

The image forming apparatus may further include a user interface to display the determined XPS file. The communication interface can transmit information of whether the received printing data is the XPS file to the external device.

When the received printing data is not the XPS file, the distinguisher may determine whether the received printing data is PDL printing data, the image former may print the received printing data using a PDL emulation, and may not print the printing data when the received printing data is neither the XPS file nor the PDL printing data.

The extractor may extract the file name using a file name length in the at least one local file header.

When the printing data includes a plurality of local files, the extractor sequentially may extract the file name in the local file headers.

The distinguisher may determine whether the printing data is the XPS file using at least one of an extension and a segment of the extracted file name.

The predefined extension may be at least one of '.fdseq', '.fdoc', '.fpage', '.dict', '.struct', and '.frag'.

The predefined segment may be at least one of '/Documents/n/Pages', '/Documents/n/Resources', '/Documents/n/Metadata', and '/Documents/n/Other'.

Exemplary embodiments of the present general inventive concept may also provide a method of distinguishing an XPS file includes receiving printing data from the external device, determining whether the received printing data is a compressed file, when the received printing data is the compressed file, extracting a file name in at least one local file header of the printing data, determining presence or absence of an XPS file by comparing an extension of the extracted file name with an extension predefined to distinguish the XPS file, and printing the printing data in the determined XPS file at the image forming apparatus.

The external device may be at least one of a print control terminal and a portable storage medium connectable to the image forming apparatus.

The method may further include displaying the determined XPS file in a user interface of the image forming apparatus, and transmitting information of whether the received printing data is the XPS file to the external device.

The method may further include when determining that the received printing data is not the XPS file, determining whether the received printing data is PDL printing data, and stopping printing the printing data when the received printing data is not the PDL printing data. The printing operation may print the received printing data using a PDL emulation.

The extracting operation may extract using a file name length in the local file header.

When the printing data includes a plurality of local files, the extracting operation may sequentially extract the file name in the local file headers.

The XPS file determining operation may determine whether the printing data is the XPS file using at least one of an extension and a segment of the extracted file name.

The predefined extension may be at least one of '.fdseq', '.fdoc', '.fpage', '.dict', '.struct', and '.frag'.

The predefined segment may be at least one of '/Documents/n/Pages', '/Documents/n/Resources', '/Documents/n/Metadata', and '/Documents/n/Other'.

Exemplary embodiments of the present general inventive concept also provide a method of printing data with an image forming apparatus, the method including receiving printing data from an external device communicatively coupled to the image forming apparatus, determining whether the received printing data includes a XPS (extensible markup language paper specification) file by comparing an extension of the file of the received printing data with a predetermined file extension, and printing the printing data of the determined XPS file with the image forming apparatus.

The method may include where the determining whether the received printing data includes the XPS file includes extracting a file name from a least one file header of the printing data, and determining whether the printing data includes the XPS file by comparing an extension of the extracted file name with a predetermined extension.

The method may include where the determining whether the received printing data includes the XPS file includes determining whether the received printing data is a compressed file, extracting a file name from at least one file header of the printing data, and determining whether the printing data includes the XPS file by comparing an extension of the extracted file name with a predetermined extension.

Exemplary embodiments of the present general inventive concept also provide an image forming apparatus communicatively coupled to an external device to print an XML (extensible markup language) Paper Specification (XPS) file, including a communication interface to receive printing data from the external device, a controller to determine whether the received printing data includes a XPS (extensible markup language paper specification) file by comparing an extension of the file of the received printing data with a predetermined file extension, and an image former to print the printing data of the determined XPS file.

The apparatus may include where the controller extracts a file name from a least one file header of the printing data, and determines whether the printing data includes the XPS file by comparing an extension of the extracted file name with a predetermined extension.

The apparatus may include where the controller determines whether the received printing data is a compressed file, extracts a file name from at least one file header of the printing data, and determines whether the printing data includes the XPS file by comparing an extension of the extracted file name with a predetermined extension.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 4 and 5 are diagrams illustrating a data structure of the XPS file;

FIG. 6 is a diagram illustrating examples of predefined extensions and segments according to an exemplary embodiments of the present general inventive concept;

FIG. 7 is a diagrams illustrating tags in an XPS attribute file according to exemplary embodiments of the present general inventive concept; and FIG. 8 is a flowchart illustrating a method of distinguishing the XPS file according to exemplary embodiments of the present general inventive concept.

DETAILED DESCRIPTION OF THE EMBODIMENTS

Figure 1:
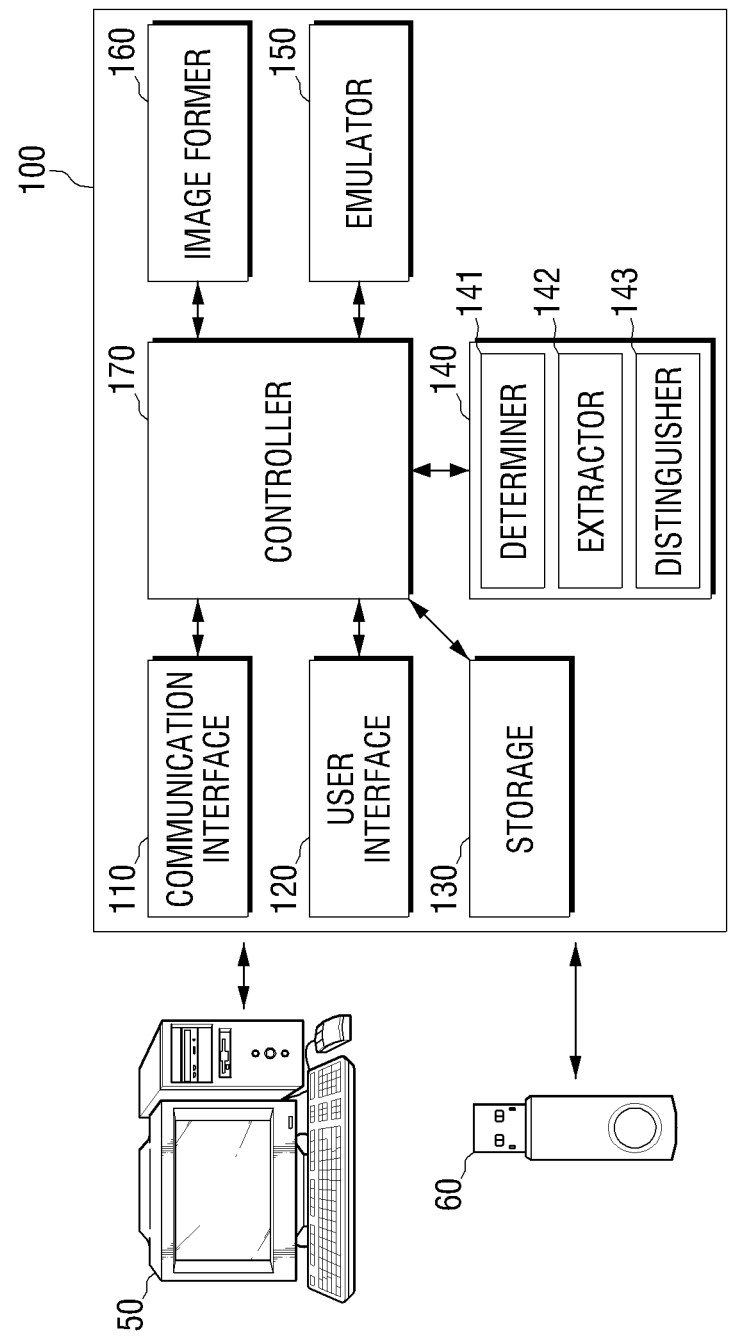
FIG. 1 is a block diagram illustrating an image forming apparatus according to exemplary embodiments of the present general inventive concept.

Reference will now be made in detail to the embodiment of the present general inventive concept, examples of which are illustrated in the accompanying drawings, wherein like reference numerals refer to the like elements throughout. The exemplary embodiments are described below in order to explain the present general inventive concept by referring to the drawings.

FIG. 1 is a block diagram of an image forming apparatus 100 according to exemplary embodiments of the present general inventive concept. The image forming apparatus 100 of FIG. 1 can include a communication interface 110, a user interface 120, a storage 130, a printing data distinguisher 140, an emulator 150, an image former 160, and a controller 170.

The communication interface 110 can receive printing data from a print control terminal 50 via a wired and/or wireless communications link. The printing data processable in the image forming apparatus 100 can include Page Description Language (PDL) data written in Printer Command Language (PCL) and PostScript® (PS) language, and an XPS file. The communication interface 110 can be communicatively coupled to the image forming apparatus 100 with an external device and can be implemented using a parallel port, a Universal Serial Bus (USB) port, and/or a wireless module. While the single print control terminal 50 connected is illustrated in FIG. 1, the image forming apparatus 100 can be communicatively coupled to a plurality of print control terminals and to a plurality of print control terminals via a server in exemplary embodiments of the present general inventive concept.

Herein, an XML Paper Specification (XPS) file can include printing data with printing options set in a tree structure including a plurality of layers, as described above. In more detail, the XPS file can include the plurality of the layers. A separate printing option can be defined per layer and per tree node.

Figure 2:
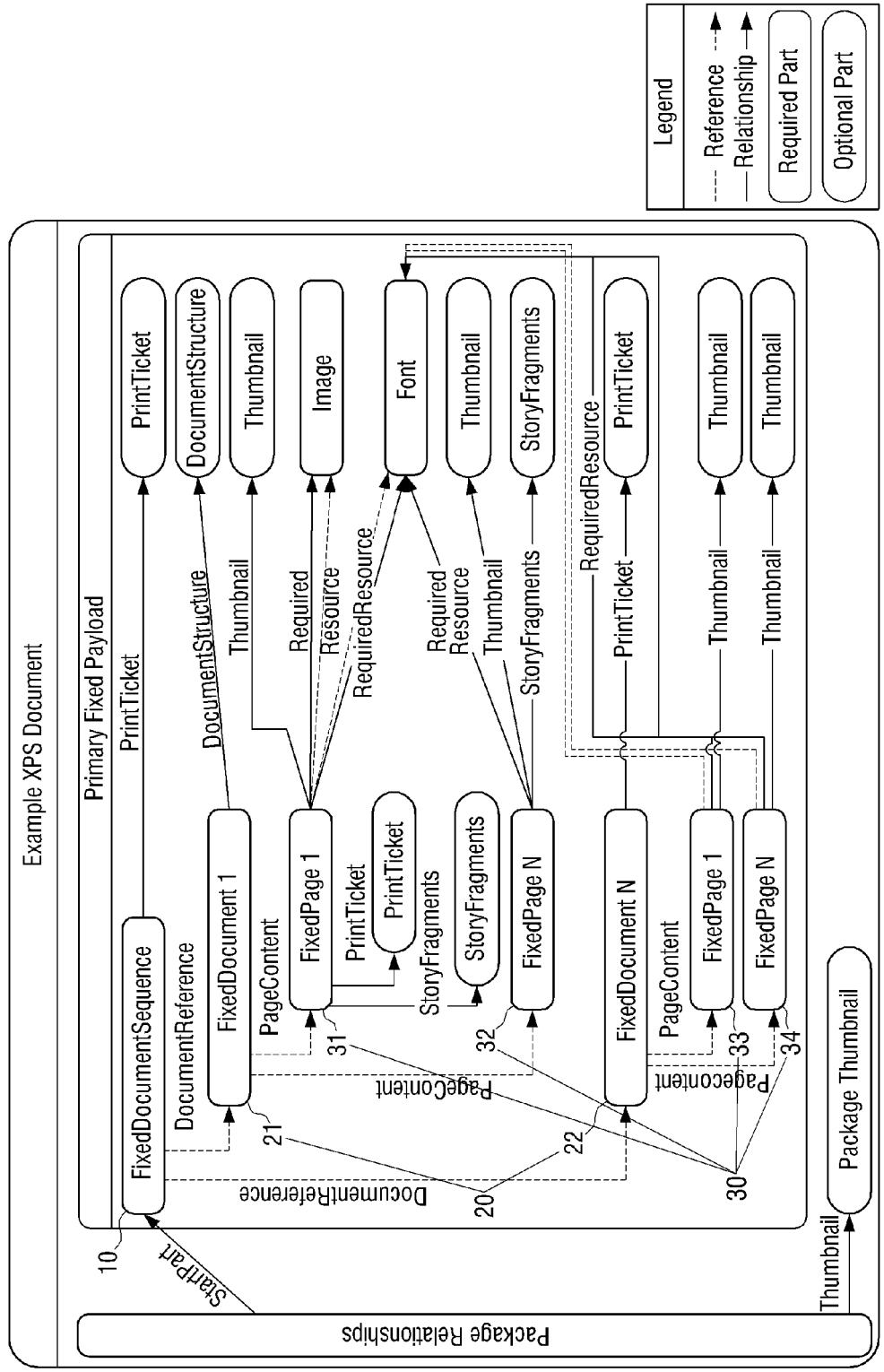
FIG. 2 is a conceptual diagram illustrating a logical structure of an XPS file.

For example, as illustrated in FIG. 2, the layers can include three levels including a job level 10, a document level 20, and a page level 30. In one or more document level 20 (e.g., each document level 20) and one or more page level 30 (e.g., each page level 30), printing options can be set for the plurality of documents and pages. More specifically, the printing option 'on both sides' can be set in the job level 10, the printing option '2-up' can be set in a first document 21 of the document level 20, the printing option 'A4 paper' can be set in a first page 31 of the first document 21, and the printing option 'A5 paper' can be set in a second page 32 of the first document 21. The printing option at the node of each logical structure can be applied to the lower layers as the effective printing option.

Printing options may also be set for a last document 22 on the document level 20, and options may be set in the page level 30 for the first page 33 and a next page 34 of the last document 22. In exemplary embodiments of the present general inventive concept, there may be zero, one, or a plurality of documents in the document level 20 between the first document 21 and the last document 22.

The communication interface 110 can receive the printing data from a portable storage medium 60. The communication interface 110 can receive the printing data from the portable storage medium 60 using serial communication or any other suitable communications link to carry out the exemplary embodiments of the present general inventive concept. When the portable storage medium 60 is communicatively coupled to the image forming apparatus 100, files stored in the connected portable storage medium 60 may be displayed to a user via the user interface 120, and the printing data may be received from the portable storage medium 60 by selecting one of the displayed files as the printing data.

The communication interface 110 can transmit information of whether the received printing data is the XPS file, to the external device. When receiving the printing data from the print control terminal 50, the communication interface 110 can send the determination result (whether the receiving printing data is the XPS file) of a distinguisher 143, described below, to the print control terminal 50. When receiving the printing data from the portable storage medium 60, the communication interface 110 can send the determination result of the distinguisher 143 to the portable storage medium 60. When the received printing data is neither the XPS file nor the PDL printing data according to the determination of the distinguisher 143, the communication interface 110 can transmit information to the external devices 50 and 60, where the information includes infeasible printing information.

The user interface 120 can include a plurality of function keys to allow the user to set or select various functions supported by the image forming apparatus 100, and can display information provided from the image forming apparatus 100. The user interface 120 can include a device, such as touchpad, to input and output information at the same time, or a device combining a mouse and a monitor. Using a user interface window provided through the user interface 120, the user can determine whether to print the printing data received from the print control terminal 50 and can select and print the file stored in the portable storage medium 60.

The user interface 120 can display the information of whether the received printing data is the XPS file. The user interface 120 can display the determination result of the distinguisher 143, described below, in the user interface window. When the received printing data is neither the XPS file nor the PDL printing data according to the determination of the distinguisher 143, the user interface 120 can notify the user of the infeasible printing.

The storage 130 can store the printing data. The storage 130 can temporarily store the printing data received via the communication interface 110. The storage 130 may store the identification information of the printing data together with the corresponding printing data through the following process. Herein, the identification information can be information of which emulation can process the corresponding printing data or information of the file type of the corresponding printing data. Meanwhile, the storage 130 can be not only a storage medium in the print control terminal 100 but also an external storage medium, a removable disk including a USB memory, and a web server over the network, or any other suitable storage medium to carry out the exemplary embodiments of the present general inventive concept.

The printing data distinguisher 140 can identify which emulation is to process the received printing data. In more detail, when receiving a PJL command informing of the type of the printing data from the print control terminal 50 through the communication interface 110, the printing data distinguisher 140 can distinguish the received printing data according to the received PJL command.

When receiving no PJL command for the corresponding printing data, for example, when receiving the printing data in a direct printing manner, the printing data distinguisher 140 can determine whether to process the received printing data at an XPS emulation or other emulation (e.g., PDL emulation).

The operation to determine whether the received printing data is the XPS file is described below.

The printing data distinguisher 140 can include a determiner 141, an extractor 142, and the distinguisher 143. Hereafter, the structures of the printing data distinguisher 140 are described in detail.

The determiner 141 can determine whether the received printing data 400 is compressed. The XPS file is the compressed ZIP file which systemizes a plurality of resources (e.g., every resource) in the directory structure as discussed above. The ZIP file can include first four bytes 410 '504B0304' as illustrated in FIG. 4. Accordingly, the distinguisher 141 can determine whether the received printing data 400 is the compressed file by examining whether the first four bytes of the received printing data are '504B0304'. When the compressed file is determined using the first four bytes of the received printing data 400 in the exemplary embodiments of the present general inventive concept, whether the printing data is the compressed file can be determined using an extension of the received printing data in the exemplary embodiments of the present general inventive concept.

The extractor 142 can extract a file name in a local file header of the printing data. Detailed operations of the extractor 142 are described below with reference to FIG. 3.

Figure 3:
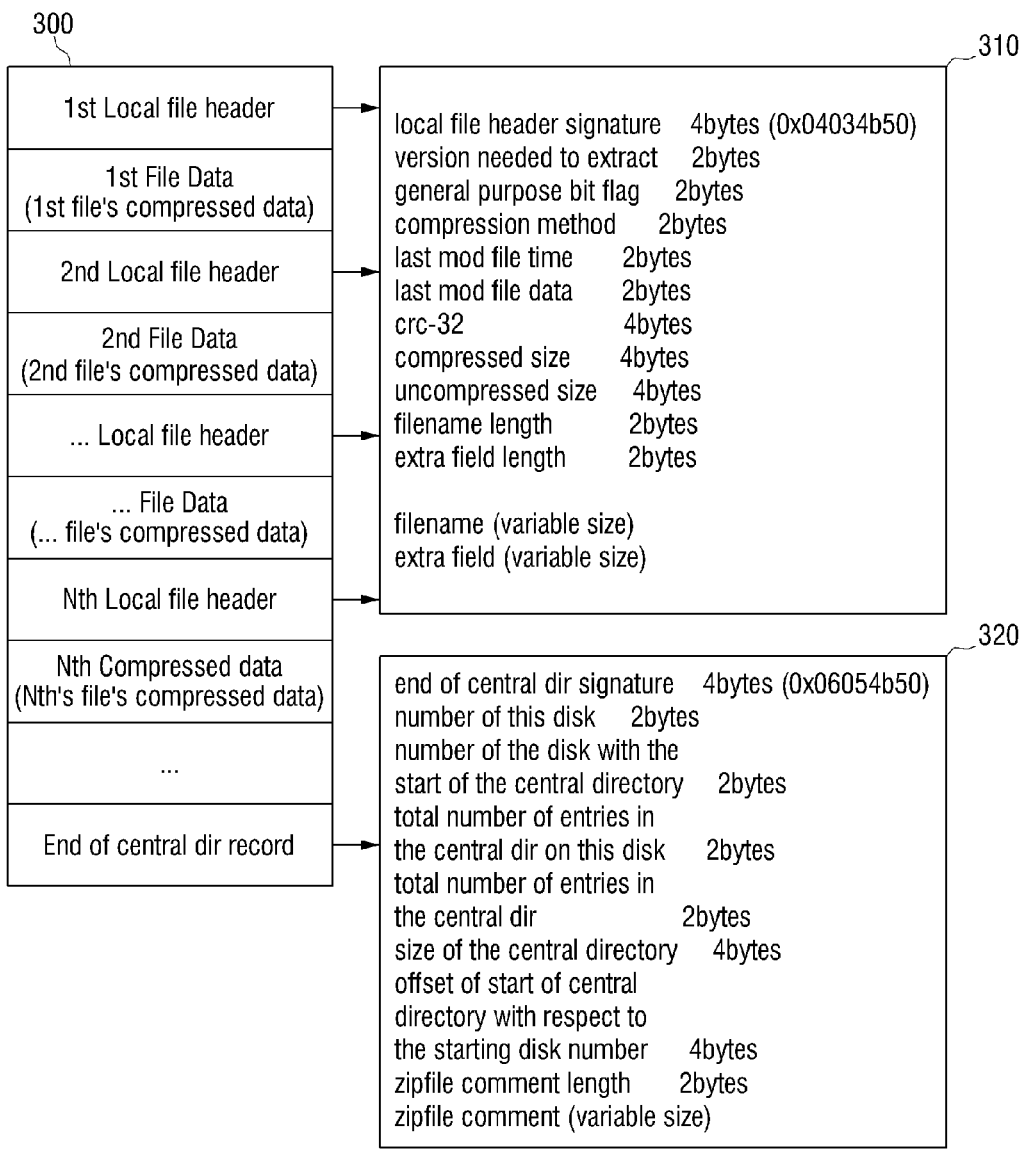
FIG. 3 is a conceptual diagram illustrating a ZIP file format.

FIG. 3 illustrates a conceptual diagram of the ZIP file format according to exemplary embodiments of the present general inventive concept.

The XPS file can be the compressed ZIP file of the data and the resources of which the reference is written in the XML as described above. The XPS file can be a ZIP type as illustrated in FIG. 3.

Referring to FIG. 3, the ZIP file can include a plurality of data regions 300 and header regions 310 corresponding to the data regions. The data region 300 can contain the substantial data, and the header region 310 can contain information such as data file name and data compression status. One data region and one header can be one local file. The data region can be compressed or uncompressed according to its setting. At the end of the ZIP file, an 'end of central dir record' region 320 can identify the end of the data.

The file name of the data stored compressed or uncompressed in the data region can be stored to the local file header region. Without decompressing the ZIP file, files can be identified in the ZIP file by use of the local file header region.

The file header region 310 can include a file name length 510. Herein, the file name length can be byte size information of the file name written in the local file header, or can be any other suitable length to carry out the exemplary embodiments of the present general inventive concept. The file name length is placed at a particular location (e.g., a predetermined location, a selected location, etc.) in the local file header as illustrated in FIG. 5.

Hence, the extractor 142 can extract the file name in the local file header using the file name length. For example, when the file name length is '1B00' as illustrated in FIG. 5, the extractor 142 can confirm that the file name in the file header is 27 bytes and extract the file name in the local file header by extracting 27-byte size from the particular region (e.g., file name region 520) of the local file header. That is, the '1B00' value can express a hexadecimal value of 27 (i.e., 1B in the hexadecimal number system is 27 in the decimal number system), which can be the size in bytes (i.e., 27) of the file name in the file header. The file name region 520 can be the file name having the exemplary 27 bytes to be extracted.

The extractor 142 can access the file header region of the received printing data, extract the file name of the local file header, and forward the extracted file names to the distinguisher 143. For example, the extractor 142 can sequentially access the file header region and sequentially extract the file name. The extractor 142 may forward at least one of the file names (e.g., all of the file names) in the file header regions to the distinguisher 143 together (e.g., all of the file names can be forwarded together). To determine whether the received printing data is the XPS file, the file name of the local file header can be extracted (e.g., sequentially extracted) and the extracted file names can be forwarded (e.g., sequentially forwarded) to the distinguisher 143.

The distinguisher 143 can determine whether the received printing data is the XPS file by comparing the extension of the extracted file name with a predefined extension. In detail, the distinguisher 143 can compare the extension of the file name extracted by the extractor 142 with the predefined extension such as '.fdseq', '.fdoc', '.fpage', '.dict', '.struct', and '.frag', and/or any other suitable predefined extension to carry out the exemplary embodiments of the present general inventive concept. When the extension of the file name extracted by the extractor 142 is the predefined extension, the extractor 142 can determine that the received printing data is the XPS file. Herein, the predefined extension to identify the XPS file can be the extension used in the XPS and the extension of a file not used in other printing data than the XPS file. Although the six exemplary extensions of the file extensions used in the XPS are described above, other extensions can be added or some of those extensions can be excluded.

The distinguisher 143 can determine whether the printing data is the XPS file by comparing a segment of the extracted file name (e.g., at least a portion of the extracted file name) with a predefined segment. When the file name extracted by the extractor 142 includes the predefined segment such as '/Documents/n/Pages', '/Documents/n/Resources', '/Documents/n/Metadata', and '/Documents/n/Other', the distinguisher 143 can determine the received printing data as the XPS file. Herein, the predefined segment can be a folder name used in the XPS. Although four segments of the segments used in the XPS are described above in connection with exemplary embodiments of the present general inventive concept, other segments can be added as illustrated in table 600 of FIG. 6, or one or more of those segments can be excluded.

When the extracted file name is 'Content_Types.xml', the distinguisher 143 can determine the received printing data as the XPS file. Herein, the 'Content_Types.xml' file can specify the connection between the file used in the XPS and the file extension and can redefine a particular Uniform Resource Indicator (URI). When the extracted file name is 'Content_Types.xml', the corresponding local file region can be parsed to check whether the 'Content_Types.xml' file includes 'vnd.ms-package.xps' attribute value, and to determine the XPS file. Examples of the connection between the file and the extension of the XPS file in the 'Content_Types.xml' file are illustrated in FIG. 7.

Upon determining that the received printing data is not the XPS file, the distinguisher 143 can determine whether the received printing data is PDL printing data. That is, the distinguisher 143 can determine whether the received printing data is to be processed at the PDL emulation. The determining of whether the received printing data is the printing data written in the PDL such as PS and PCL to be processed at the PDL emulation can be the same as in the conventional method and thus shall not be explained in detail.

The emulator 150 can include the XPS emulation for processing the printing of the XPS file, and the PDL emulation for processing the printing of the PDL data. The emulator 150 can parse and render the received printing data using the emulation corresponding to the type of the printing data identified by the printing data distinguisher 140.

The image former 160 can print the received printing data. The image former 160 can print the printing data rendered by the emulator 150.

The controller 170 can control the components of the image forming apparatus 100. In detail, when receiving the printing data via the communication interface 110, the controller 170 can control the printing data distinguisher 140 to determine which emulation processes the received printing data.

The controller 170 can control the emulator 150 to parse and render the printing data through the emulation corresponding to the type of the printing data identified by the printing data distinguisher 140, and can control the image former 160 to output the parsed and rendered printing data.

When there is no emulation determined and/or selected to process the received printing data, the controller 170 can control the emulator 150 and the image former 160 not to print the received printing data. More specifically, when the received printing data is neither the XPS file nor the PDL printing data, the controller 170 can control the emulator 150 and the image former 160 not to print the received printing data. The controller 170 can control the communication interface 110 to notify the error (e.g., the infeasible printing) to the external device 50 and/or 60 by transmitting the printing data, or by controlling the user interface 120 to display the error to the user.

The controller 170 can store the identification information of the printing data distinguished by the printing data distinguisher 140 and the received printing data to the storage 130. Since the received printing data can be output repeatedly, the controller 170 can store the received printing data together with the identification information of the received printing data. This operation can be carried out according to the selection of the user or according to a predetermined and/or preset selection, and can be automatically performed without a user's separate storage command.

The storage 130 may store the identification information of the printing data together with the corresponding printing data. Herein, the identification information can include information relating to which emulation needs to process the corresponding printing data and information relating to the file type of the corresponding printing data.

The image forming apparatus 100 can distinguish the XPS file using the file name written in the local file header region of the XPS file and thus promptly acquire that the received printing data to be processed by the XPS emulation.

FIG. 8 is a flowchart illustrating a method of distinguishing the XPS file according to exemplary embodiments of the present general inventive concept.

Referring to FIG. 8, the printing data is received from the external device at operation S810. The printing data can be received from the print control terminal 50 that is connectable to the image forming apparatus 100. Alternatively, when the portable storage medium 60 is connected to the image forming apparatus 100, the printing data can be received from the portable storage medium 60 by receiving the print command for at least one of the files stored to the portable storage medium 60 from the user.

Upon receiving the printing data, the method can determine whether the received printing data is the compressed file at operation S820. As described above, the XPS file can be the compressed ZIP file systemizing one or more resources (e.g., every resource) in the directory structure. Since the ZIP file has the first four bytes 410 '504B0304' as illustrated in FIG. 4, the method can determine whether the received printing data is the compressed file by checking whether the first four bytes of the received printing data are '0x04034b50'. The extension of the received printing data may be used to determine whether the received printing data is the compressed file.

When the received printing data is the compressed file, the extractor 142 can extract the file name in the local file header of the printing data at operation S830). More specifically, the XPS file can be the compressed ZIP file and the ZIP file can include the plurality of the local files including the data region and the corresponding header. The local file header contains the information such as data file name and data compression status. Hence, the file name in the local file header can be extracted using the file name length written in the local file header. For example, when the file name length is '0x001b' as illustrated in FIG. 5, the method as illustrated in FIG. 8 can acquire that the file name in the file header is 27 bytes and extract the file name in the local file header by extracting the 27-byte size from the particular region of the local file header.

When the file name in the local file header is extracted, the method can compare the extension of the extracted file name with the predefined extension at operation S840. In detail, the distinguisher 143 can check whether the extracted file name includes the predefined extension such as '.fdseq', '.fdoc', '.fpage', '.dict', '.struct', and '.frag', or any other suitable file extension to carry out the exemplary embodiments of the present general inventive concept as disclosed herein. The predefined extension is the extension used in the XPS and the extension of the file not used in other printing data than the XPS file. Although six exemplary file extensions used in the XPS are illustrated, other extensions can be added or some of those extensions can be excluded.

The checking step (e.g., operation s840) can compare the segment of the extracted file name with the predefined segment. The method can check whether the extracted file name includes the predefined segment such as '/Documents/n/Pages','/Documents/n/Resources', '/Documents/n/Metadata', and '/Documents/n/Other'. Herein, the predefined segment can be a folder name used in the XPS. Although four of the segments used in the XPS are illustrated, other segments can be added as illustrated in FIG. 6, or one or more of those segments can be excluded.

The checking step (e.g., operation s840) can check whether the extracted file name is 'Content_Types.xml'. Herein, the 'Content_Types.xml' file can specify the connection between the file used in the XPS and the file extension and can redefine a particular URI.

When the extracted file name includes the predefined extension segment or when the extracted file name is the predefined file name, the method can determine that the received printing data is the XPS file at operation S860. While the use of the predefined extension, the use of the predefined segment, and the use of the predefined file name are illustrated individually in the exemplary embodiments of the present general inventive concept, the three uses can be combined. For example, the checking whether the extracted file name includes the predefined extension, when the predefined extension is not contained, the method can check whether the predefined segment is included. When detecting no predefined segment, the method can check whether the extracted file name has the predefined file name.

When determining that the received printing data is the XPS file at operation S860, the method can print the received printing data using the XPS emulation at operation S890.

By contrast, when the extracted file name does not include the predefined extension and the local file header corresponding to the currently extracted file name is not the last file header at operation S850, the method can repeat operations S830 and S840.

When the received printing data is not the compressed file or when the last header of the local file of the received printing data does not include the predefined extension, the predefined segment, and the predefined file name, the determiner 141 can determine whether the received printing data is the printing data other than the XPS file. In more detail, the determiner 141 can determine whether the received printing data is the PDL printing data at operation S865. When the received printing data is the PDL printing data according to the determination at operation S870, the image forming apparatus 100 can print the received printing data using the PDL emulation at operation S890. When the received printing data is not the PDL printing data either, the image forming apparatus 100 can stop the printing job at operation S875. The communication interface 110 can display the infeasible printing job of the received printing job to the user through the user interface or notify the infeasible printing job to the external device which sends the printing data at operation S880.

When the file name of the local file header is extracted (e.g., sequentially extracted) and distinguished by accessing (e.g., sequentially accessing) the file header region of the received printing data in FIG. 8, the file name written in the file header region can be extracted (e.g., the file name written in every file header region can be extracted all together) and it can be checked whether the file names extracted at one time include the predefined extension and segment in the implementation.

As the image forming apparatus distinguishes the XPS file using the local file header region of the received printing data, the recognition speed of the XPS file can be increased in the image forming apparatus. The XPS file identifying method illustrated in FIG. 8 can be executed in the image forming apparatus 100 of FIG. 1 and in other image forming apparatuses that carry out the exemplary embodiments of the present general inventive concept as disclosed herein.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus connectable to an external device to print an XML (extensible markup language) Paper Specification (XPS) file, comprising:
   a communication interface to receive printing data from the external device;
   a determiner to determine whether the received printing data is a compressed file;
   an extractor to extract a file name in at least one local file header of the printing data when the received printing data is the compressed file;
   a distinguisher to determine a presence or absence of an XPS file by comparing an extension of the extracted file name with a predefined extension to distinguish the XPS file; and
   an image former to print the printing data in the determined XPS file,
   wherein, when the received printing data is not the XPS file, the distinguisher determines whether the received printing data is PDL (Page Description Language) printing data, and
   the image former prints the received printing data using a PDL emulation, and does not print the printing data when the received printing data is neither the XPS file nor the PDL printing data.

2. The image forming apparatus of claim 1, wherein the external device comprises:
   at least one of a print control terminal and a portable storage medium connectable to the image forming apparatus.

3. The image forming apparatus of claim 1, further comprising:
   a user interface to display the determined XPS file,
   wherein the communication interface transmits information of whether the received printing data is the XPS file to the external device.

4. The image forming apparatus of claim 1, wherein the extractor extracts the file name using a file name length in the at least one local file header.

5. The image forming apparatus of claim 1, wherein, when the printing data comprises a plurality of local files, the extractor sequentially extracts the file name in the at least one local file header.

6. The image forming apparatus of claim 1, wherein the distinguisher determines whether the printing data is the XPS file using at least one of an extension and a segment of the extracted file name.

7. An image forming apparatus connectable to an external device to print an XML (extensible markup language) Paper Specification (XPS) file, comprising:
   a communication interface to receive printing data from the external device;
   a determiner to determine whether the received printing data is a compressed file;
   an extractor to extract a file name in at least one local file header of the printing data when the received printing data is the compressed file;
   a distinguisher to determine a presence or absence of an XPS file by comparing an extension of the extracted file name with a predefined extension to distinguish the XPS file; and
   an image former to print the printing data in the determined XPS file,
   wherein the predefined extension is at least one of .fdseq, .fdoc, .fpage, .dict, .struct, and .frag.

8. An image forming apparatus connectable to an external device to print an XML (extensible markup language) Paper Specification (XPS) file, comprising:
   a communication interface to receive printing data from the external device;
   a determiner to determine whether the received printing data is a compressed file;
   an extractor to extract a file name in at least one local file header of the printing data when the received printing data is the compressed file;
   a distinguisher to determine a presence or absence of an XPS file by comparing an extension of the extracted file name with a predefined extension to distinguish the XPS file; and
   an image former to print the printing data in the determined XPS file,
   wherein the predefined segment is at least one of /Documents/n/Pages, /Documents/n/Resources, /Documents/n/Metadata, and /Documents/n/Other.

9. A method of distinguishing an XML (extensible markup language) Paper Specification (XPS) file of an image forming apparatus connectable to an external device to print the XPS file, the method comprising:
   receiving printing data from the external device;
   determining whether the received printing data is a compressed file;
   when the received printing data is the compressed file, extracting a file name in at least one local file header of the printing data;
   determining presence or absence of an XPS file by comparing an extension of the extracted file name with a predefined extension to distinguish the XPS file; and
   printing the printing data in the determined XPS file at the image forming apparatus,
   when determining that the received printing data is not the XPS file, determining whether the received printing data is PDL (Page Description Language) printing data; and
   stopping printing the printing data when the received printing data is not the PDL printing data,
   wherein the printing operation prints the received printing data using a PDL emulation.

10. The method of claim 9, wherein the external device is at least one of a print control terminal and a portable storage medium connectable to the image forming apparatus.

11. The method of claim 9, further comprising:
   displaying the determined XPS file in a user interface of the image forming apparatus; and
   transmitting information of whether the received printing data is the XPS file to the external device.

12. The method of claim 9, wherein the extracting operation extracts using a file name length in the local file header.

13. The method of claim 9, wherein, when the printing data comprises a plurality of local files, the extracting operation sequentially extracts the file name in the local file headers.

14. The method of claim 9, wherein the XPS file determining operation determines whether the printing data is the XPS file using at least one of an extension and a segment of the extracted file name.

15. A method of distinguishing an XML (extensible markup language) Paper Specification (XPS) file of an image forming apparatus connectable to an external device to print the XPS file, the method comprising:
- receiving printing data from the external device;
- determining whether the received printing data is a compressed file;
- when the received printing data is the compressed file, extracting a file name in at least one local file header of the printing data;
- determining presence or absence of an XPS file by comparing an extension of the extracted file name with a predefined extension to distinguish the XPS file; and
- printing the printing data in the determined XPS file at the image forming apparatus,
- wherein the predefined extension is at least one of .fdseq, .fdoc, .fpage, .dict, .struct, and .frag.

16. A method of distinguishing an XML (extensible markup language) Paper Specification (XPS) file of an image forming apparatus connectable to an external device to print the XPS file, the method comprising:
- receiving printing data from the external device;
- determining whether the received printing data is a compressed file;
- when the received printing data is the compressed file, extracting a file name in at least one local file header of the printing data;
- determining presence or absence of an XPS file by comparing an extension of the extracted file name with a predefined extension to distinguish the XPS file; and
- printing the printing data in the determined XPS file at the image forming apparatus,
- wherein the predefined segment is at least one of /Documents/n/Pages, /Documents/n/Resources, /Documents/n/Metadata, and /Documents/n/Other.

17. A method of printing data with an image forming apparatus, the method comprising:
- receiving printing data from an external device communicatively coupled to the image forming apparatus;
- determining whether the received printing data includes a XPS (extensible markup language paper specification) file by comparing an extension of the file of the received printing data with a predetermined file extension; and
- printing the printing data of the determined XPS file with the image forming apparatus,
- wherein the predefined file extension is at least one of .fdseq, .fdoc, .fpage, .dict, .struct, and .frag.

18. The method of claim 17, wherein the determining whether the received printing data includes the XPS file comprises:
- extracting a file name from a least one file header of the printing data; and
- determining whether the printing data includes the XPS file by comparing an extension of the extracted file name with a predetermined extension.

19. The method of claim 17, wherein the determining whether the received printing data includes the XPS file comprises:
- determining whether the received printing data is a compressed file;
- extracting a file name from at least one file header of the printing data, and
- determining whether the printing data includes the XPS file by comparing an extension of the extracted file name with a predetermined extension.

20. An image forming apparatus communicatively coupled to an external device to print an XML (extensible markup language) Paper Specification (XPS) file, comprising:
- a communication interface to receive printing data from the external device;
- a controller to determine whether the received printing data includes a XPS (extensible markup language paper specification) file by comparing an extension of the file of the received printing data with a predetermined file extension; and
- an image former to print the printing data of the determined XPS file,
- wherein the predefined file extension is at least one of .fdseq, .fdoc, .fpaqe, .dict, .struct, and .fraq.

21. The apparatus of claim 20, wherein the controller extracts a file name from a least one file header of the printing data, and determines whether the printing data includes the XPS file by comparing an extension of the extracted file name with a predetermined extension.

22. The apparatus of claim 20, wherein the controller determines whether the received printing data is a compressed file, extracts a file name from at least one file header of the printing data, and determines whether the printing data includes the XPS file by comparing an extension of the extracted file name with a predetermined extension.

* * * * *